US008051353B2

(12) United States Patent
Maas et al.

(10) Patent No.: US 8,051,353 B2
(45) Date of Patent: Nov. 1, 2011

(54) HARQ TRANSMISSION FEEDBACK FOR HIGHER LAYER PROTOCOLS IN A COMMUNICATION SYSTEM

(75) Inventors: David R. Maas, Palatine, IL (US); Ravi M. Adatrao, West Dundee, IL (US); Pramod Karnam, Rolling Meadows, IL (US); Mark J. Marsan, Elmhurst, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1043 days.

(21) Appl. No.: 11/876,811

(22) Filed: Oct. 23, 2007

(65) Prior Publication Data
US 2008/0109693 A1 May 8, 2008

Related U.S. Application Data

(60) Provisional application No. 60/864,834, filed on Nov. 8, 2006.

(51) Int. Cl.
*H04L 1/18* (2006.01)
(52) U.S. Cl. ........................................ 714/748; 709/232
(58) Field of Classification Search .................. 370/282, 370/335, 392, 349; 714/748; 709/232
See application file for complete search history.

(56) References Cited

U.S. PATENT DOCUMENTS

| 5,677,918 | A | 10/1997 | Tran et al. | |
| 6,097,731 | A | 8/2000 | Aoki | |
| 6,735,180 | B1 * | 5/2004 | Malkamaki et al. | 370/282 |
| 6,901,063 | B2 * | 5/2005 | Vayanos et al. | 370/335 |
| 7,310,336 | B2 * | 12/2007 | Malkamaki | 370/392 |
| 7,372,836 | B2 * | 5/2008 | Hwang et al. | 370/335 |
| 7,715,360 | B2 * | 5/2010 | Chun et al. | 370/349 |
| 2006/0059186 | A1 | 3/2006 | Backlund | |

OTHER PUBLICATIONS

IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, Sections 6.3.2.2.7.2, 6.3.2.3.54, 6.3.4.6.2, 6.3.4.6.3, 6.3.17.1, and 6.3.22.1.2, Date: 2006.

* cited by examiner

Primary Examiner — David Ton

(57) ABSTRACT

A method is described for providing Hybrid Automatic Repeat Request (HARQ) transmission feedback to a higher layer protocol in a communication system. The method includes a step of detecting HARQ retransmissions in a first layer protocol. This can be used to determine a HARQ failure or an HARQ ACK after a delay of some retransmissions. A next step includes providing feedback information about the detecting step from the first layer protocol to a higher layer protocol. A next step includes instituting corrections at the higher layer protocol, in response to the information transferred from the first layer protocol. These corrections can include immediate retransmission of those bursts of a HARQ failure, or correcting timers to match the delay of eventually ACK'ed data.

15 Claims, 8 Drawing Sheets

FIG. 2 — PRIOR ART —

HARQ TRANSMISSION FEEDBACK FOR HIGHER LAYER PROTOCOLS IN A COMMUNICATION SYSTEM

FIELD OF THE INVENTION

The present invention relates generally to the field of wireless communication systems, and more particularly, to the use of Hybrid Automatic Repeat Requests in communications.

BACKGROUND OF THE INVENTION

A Hybrid Automatic Repeat Request (HARQ) is a physical layer (layer one) retransmission function in the WiMax IEEE 802.16 protocol (with variants in several cellular protocols, such as in UMTS). HARQ is a link adaptation technique where link layer acknowledgements are used for re-transmission decisions at the physical layer. For each burst transmitted in the link, a receiver may or may not receive the burst properly, due to varying channel conditions. If the burst is received properly, an acknowledged (ACK) message is returned. If the burst is not received properly, a not-acknowledged (NACK) message is returned. Upon receipt of an ACK, further data bursts can be sent. Upon receipt of a NACK a retry attempt can be made to resend the same burst information.

IEEE 802.16 defines two levels of retry attempts. The first as described above is HARQ on the physical layer. The second is on a higher layer protocol such as standard Automatic Repeat Requests (ARQ) on the data plane, or Media Access Control (MAC) timers on the control plane. As used herein, MAC layer refers to any higher layer protocol such as the control plane, data plane, or application layer. In an example, if a data burst is sent and neither an ACK or NACK is returned, or if NACKs are continually received with no retry attempts being successful (i.e. HARQ failure), it must be assumed after some period of waiting in the higher layer that the burst was not received properly. In this example, a timer on a higher layer protocol determines that there is a problem, but only after a considerable amount of time may have passed.

Unfortunately, there is no feedback mechanism defined between the physical layer and higher layers (such as the control or data plane). Typically, the retransmission at the physical layer is done independently of other higher layer MAC procedures such as ARQ or handling of MAC management messages. As a result, any HARQ failure is not directly linked to handling at the upper layer protocols, which depend upon their own retransmission mechanisms (timers, ARQ, TCP, etc) to attempt another transmission. In addition, some transfers do not have a retry mechanism and the burst loss must simply be tolerated. In addition, since HARQ does not rebuild bursts when retry attempts are made, the coding scheme for that burst cannot be changed to adapt to changing channel conditions.

Referring to FIG. 1, four cases are shown demonstrating problems that arise due to HARQ failures. In Case 1, a control plane sends a MAC management message to the physical layer which experiences HARQ failure. In this example, the RF channel conditions are changing rapidly, and the inability of HARQ to modify the coding scheme on retransmissions during the changing channel conditions makes it unlikely that HARQ will be able to successfully deliver that burst within its maximum number of retry attempts. The control plane does not know of any problems until a control plane timer timeouts, which may be much later than the time HARQ abandoned the delivery attempt. Only at this point does the control plane determine that the MAC management message must be resent, which can result in a significant delay.

In Case 2, packet data units (PDU) are to be sent from a higher layer using ARQ through the physical layer. In this case, message feedback is sent whenever a peer decides to send it. There is no time limit for the peer to respond with either an ACK or NACK, which means any transmission failure resulting in a NACK can significantly delay the resending of the data packets, even if HARQ detected a delivery failure after maximum retries.

In Case 3, a higher layer is to provide ARQ feedback. If the physical layer is unable to send the feedback (i.e. HARQ failure), the higher layer must rely on future feedback attempts to continue data transfers, which can result in a significant delay.

In Case 4, packet data units (PDU) are to be sent from a higher layer through the physical layer without using ARQ. If the physical layer is unable to send the feedback (i.e. HARQ failure), data retransmission must occur at the application layer at endpoints (e.g. TCP), which can result in a significant delay.

HARQ retransmissions also results in other deleterious effects, even when a HARQ burst is eventually acknowledged. In particular, HARQ retransmission cause delays that can upset synchronize communications between higher layer protocols of a mobile station and a base station, for example.

Referring to FIG. 2, two scenarios are shown wherein HARQ retransmissions cause delays that can upset synchronization involving bases stations and mobile stations. In Case 1, during handover there is an action time negotiated between the base station and the mobile station that defines when the mobile station will arrive at a target base station. In particular, the source base station will send a mobility base station handoff request (MOB_BSHO-REQ) to the mobile station and wait for the mobile station to send a handoff indication message indicating that the mobile station would like to move to the target base station. The target base station will use a non-contention based Fast Ranging procedure which allocates an information element in the uplink MAP. The action time sent in a mobility base station handoff response (MOB_BSHO-RSP) message should be interpreted correctly between the base station and mobile station. However, due to poor RF conditions the allocation made for the handover indication message may have been lost and the mobile station may not be able to use the non-contention based Fast Ranging IE at the target base station and might need to fall back to performing contention based bandwidth request to send the handover indication successfully. During this time handover latencies can be significantly increased.

Therefore, there is a need for a technique to provide HARQ feedback (such as for HARQ transmission failures) to higher layer protocols, so that much faster and beneficial recovery mechanisms and synchronization can be immediately instituted to prevent lost data or unnecessary retransmissions.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Figure 1:
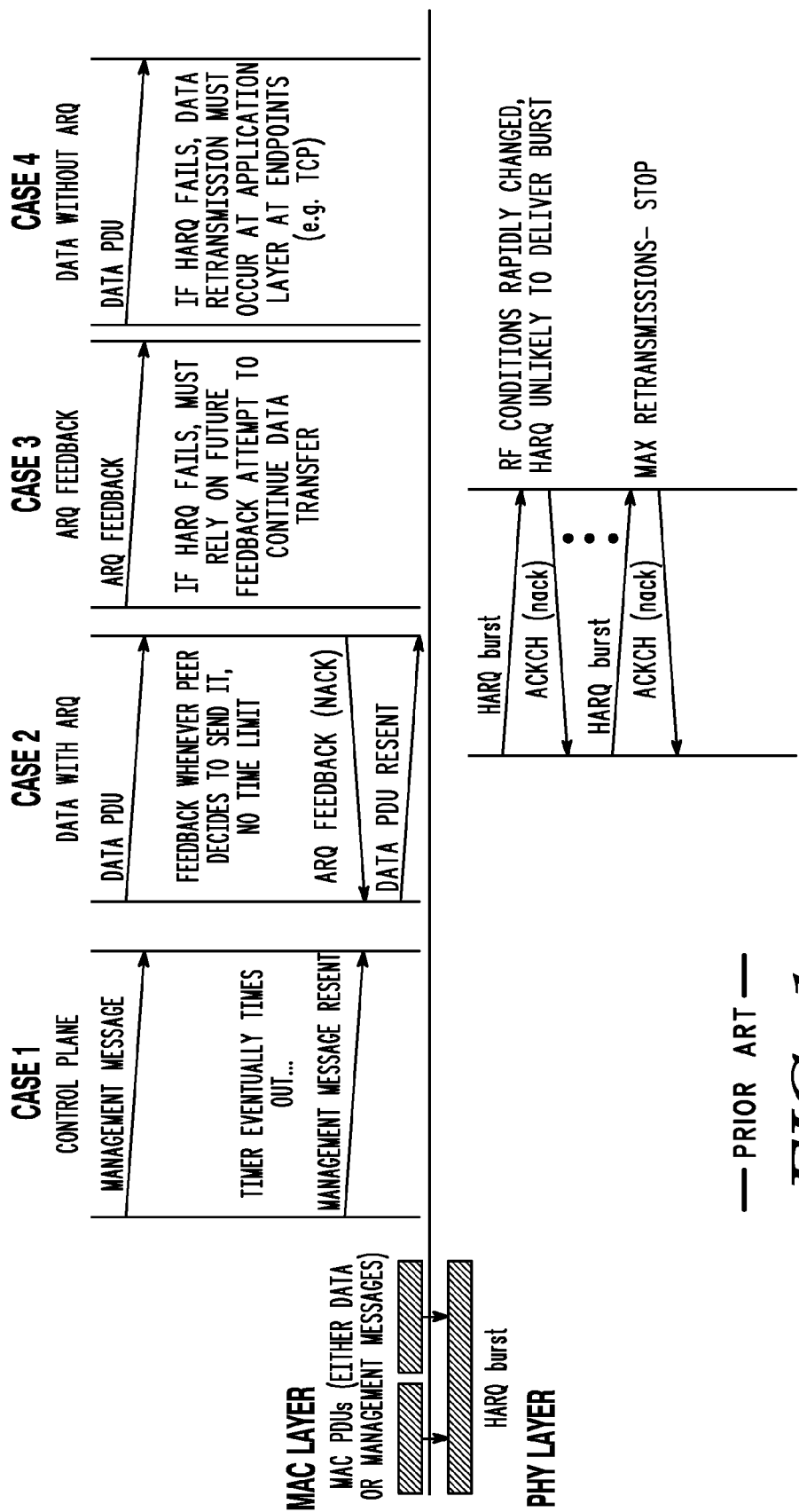
FIG. 1 shows flow diagrams of four prior art scenarios involving HARQ failures.
Figure 2:
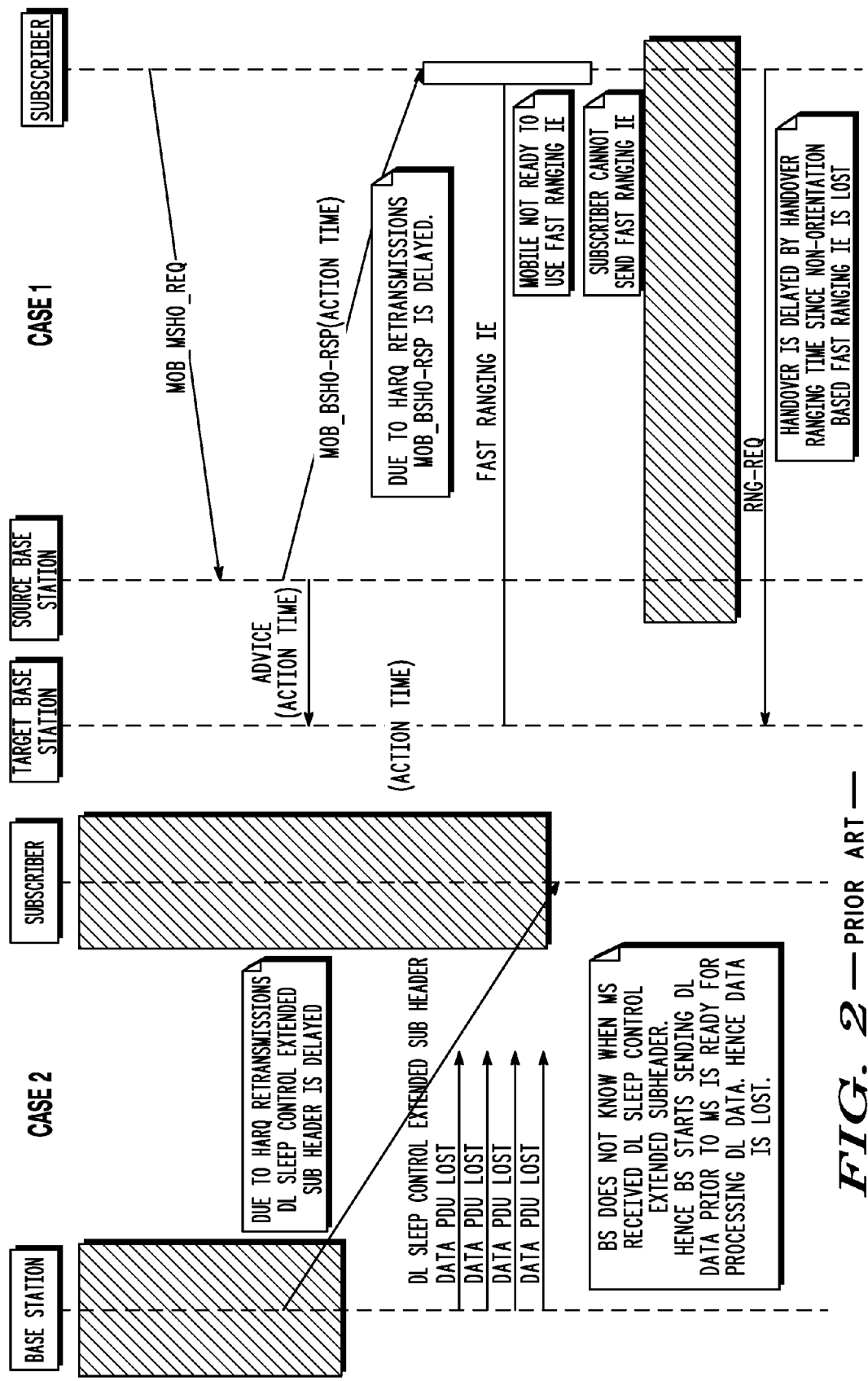
FIG. 2 shows flow diagrams of two prior art scenarios involving HARQ retransmission delays.

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE PREFERRED EMBODIMENTS

The present invention provides a technique to provide HARQ feedback to higher layer protocols in a communication system, so that much faster and beneficial recovery mechanisms and synchronization can be immediately instituted to prevent lost data or unnecessary retransmissions.

In particular, the present invention determines whether there are HARQ retransmissions in a first layer protocol. These retransmissions can involve a HARQ failure where a maximum number of NACK message are received for a burst, or can involve eventually receiving an HARQ ACK after a delay of some number of retransmissions. Information about the retransmission is sent from the first layer protocol to a higher layer protocol. The higher layer protocol, in response to the information transferred from the first layer protocol, can then institute corrections. These corrections can include immediate retransmission of those bursts of a HARQ failure, or correcting timers to match the delay of eventually ACK'ed data such that communication synchronization can be achieved.

It should be recognized that the present invention is described herein in relation to the IEEE 802.16 (WiMax) communication system, but is equally applicable to those other communication systems (e.g. UMTS) that utilize HARQ functions for retransmissions. At present, IEEE 802.16 does not link HARQ handling to any protocol interactions above HARQ physical layer. In addition, IEEE 802.16 does not provide a mechanism to determine when MS receives a given Control message that does not have an application level acknowledgement. In particular, there is no mention in the IEEE 802.16 standards of feedback from the HARQ layer to other MAC services. HARQ transmission failure is a well-known event which is signified by a change in the AI_SN bit (i.e. HARQ ID Sequence Number) without a successful acknowledgement. This failure indicates that neither the original transmission, nor any of the HARQ retries, was able to successfully deliver or rebuild the burst. Recognizing this condition also realizes that the burst contents are lost, and thus any PDUs in that burst are also lost. The present invention utilizes this knowledge to result in faster response handling by other MAC services such as MAC management messaging, ARQ, and even non-ARQ connections.

In order to specify the start of a new transmission, one-bit HARQ identifier sequence number (AI_SN) is toggled on every successful transmission of an encoder packet HARQ retransmission attempt on the same HARQ channel. If the AI_SN changes, the receiver treats the corresponding subpacket as belonging to a new encoder packet, and discards ever-received subpackets for previous HARQ attempts with the same HARQ identifier. If the AI_SN changes, the transmitter may optionally provide this information to the MAC layer for potential uses such as treating the HARQ transmission failure as an implicit timeout of a running timer waiting for a MAC management response to a MAC management message in the HARQ burst, for PDU retransmission of data PDUs on non-ARQ connections, or for retransmission of ARQ-Feedback, as detailed below.

Figure 3:
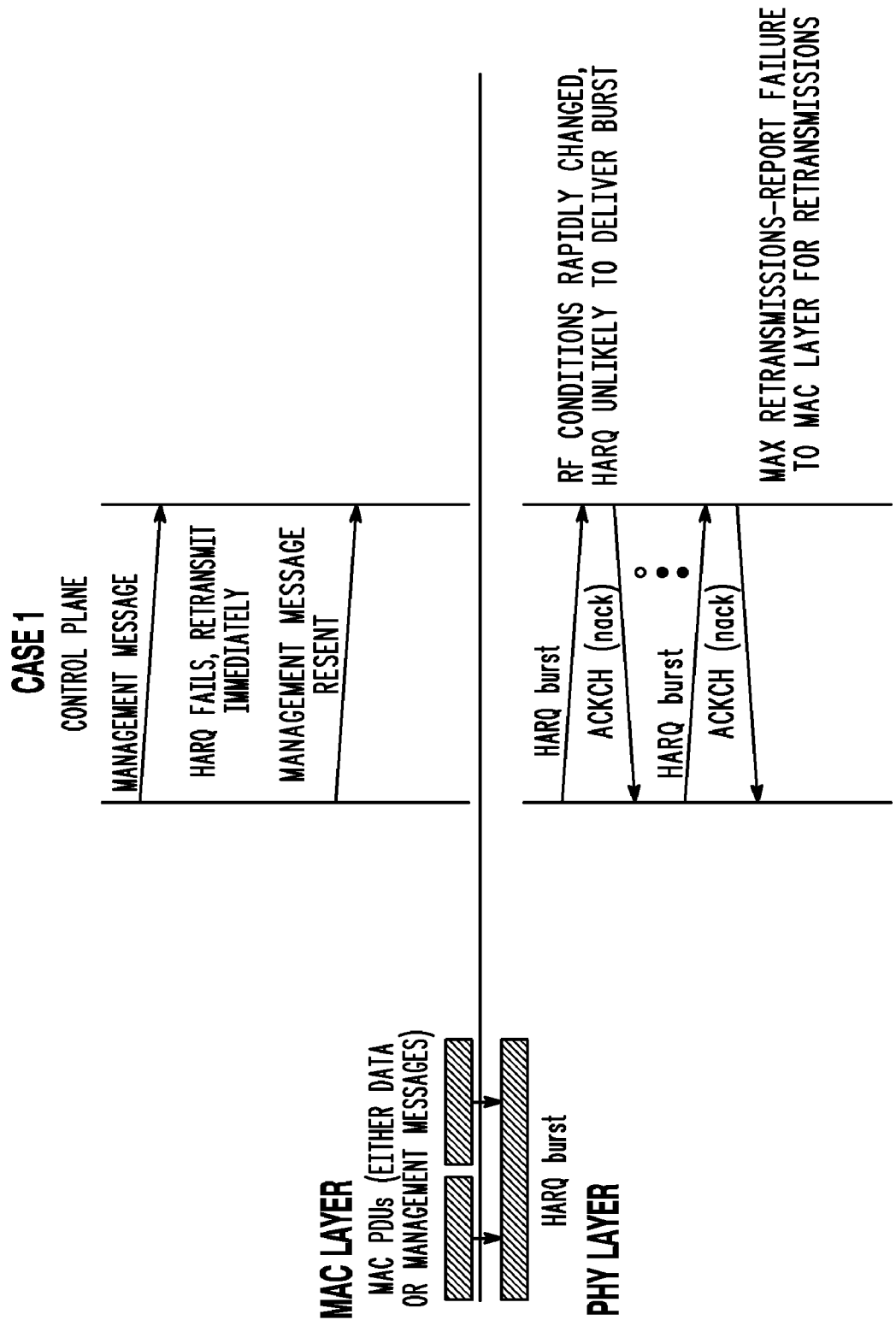
FIG. 3 is a flow chart of a first embodiment of the present invention.

Referring to FIG. 3, in a first embodiment, the present invention makes HARQ transmission failures (meaning maximum HARQ retransmissions sent unsuccessfully) known to higher protocols, wherein much faster and more beneficial recovery mechanisms can be immediately instituted. Since HARQ has built in ACK/NACK functionality and also an indication of giving up the attempt to transmit a burst (via the HARQ ID Sequence Number, AI_SN), HARQ failures are well known.

In this embodiment, a control plane sends a MAC management message to the physical layer which experiences HARQ failure. For example, the RF channel conditions are changing rapidly, and HARQ can not recode the burst to accommodate the changing conditions, which results in HARQ not being able to successfully deliver that burst within its maximum number of retry attempts. Upon detection of the maximum number of retransmission attempts (HARQ failure), feedback information including notification of HARQ failure for that particular data burst is provided from the physical layer to the MAC layer control plane before the control plane timer timeouts. At this point, the control plane can immediately institute a resending of the management message, in response to the information transferred from the physical layer, without waiting for higher layer protocol MAC control mechanisms or waiting for its timer to timeout, which in some timers could have been in the range of seconds. Inasmuch as HARQ operates a burst, the MAC layer PDUs correlate to the HARQ bursts in the physical layer, and there is a map that the MAC layer can use to determine which MAC PDUs (being either data or management messages) correspond to the failed HARQ data burst. In this way, the MAC layer knows which PDUs or portions of PDUs need to be resent.

Figure 4:
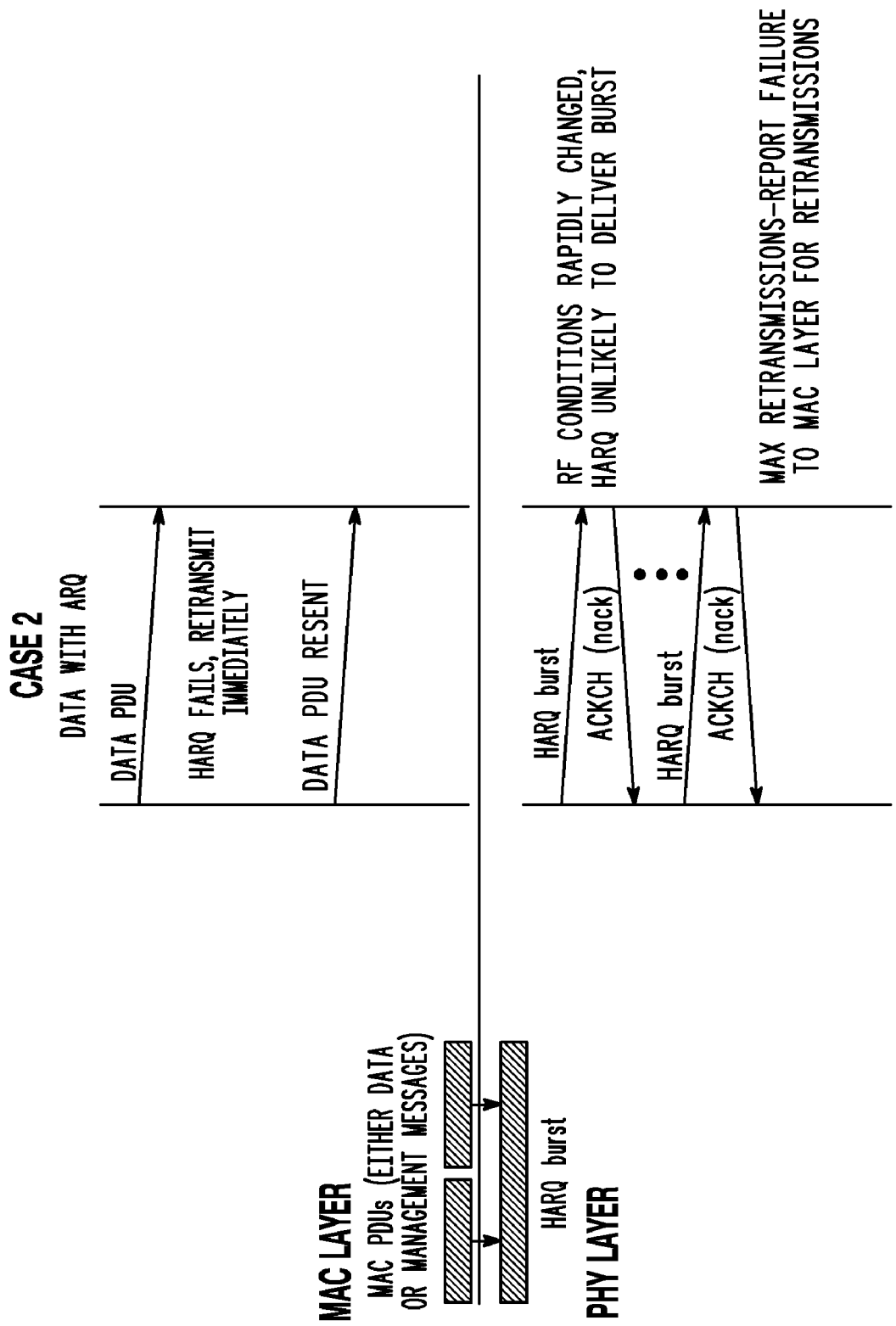
FIG. 4 is a flow chart of a second embodiment of the present invention.

Referring to FIG. 4, in a second embodiment, the present invention also makes HARQ transmission failures known to higher protocols. In this case, packet data units (PDU) are to be sent using ARQ from a higher layer through the physical layer, which experiences HARQ failure. For example, the RF channel conditions are changing rapidly, and HARQ can not recode the burst to accommodate the changing conditions, which results in HARQ not being able to successfully deliver that burst within its maximum number of retry attempts. Upon detection of the maximum number of retry attempts (HARQ failure), feedback information including notification of HARQ failure for that particular data burst is sent to the higher layer protocol. At this point, the higher layer protocol can immediately institute a resending of all or a fragment of those data packets that correlate to the failed HARQ bursts without waiting for feedback to be sent by a peer, which could be a long time since there is no time limit for the peer to respond with either an ACK or NACK. Inasmuch as HARQ operates a burst, the MAC layer PDUs correlates to the HARQ bursts in the physical layer, and there is a map that the MAC layer can use to determine which MAC PDUs (being either data or management messages) correspond to the failed HARQ data burst. In this way, the higher layer protocol knows which PDUs or portions of PDUs need to be resent.

Figure 5:
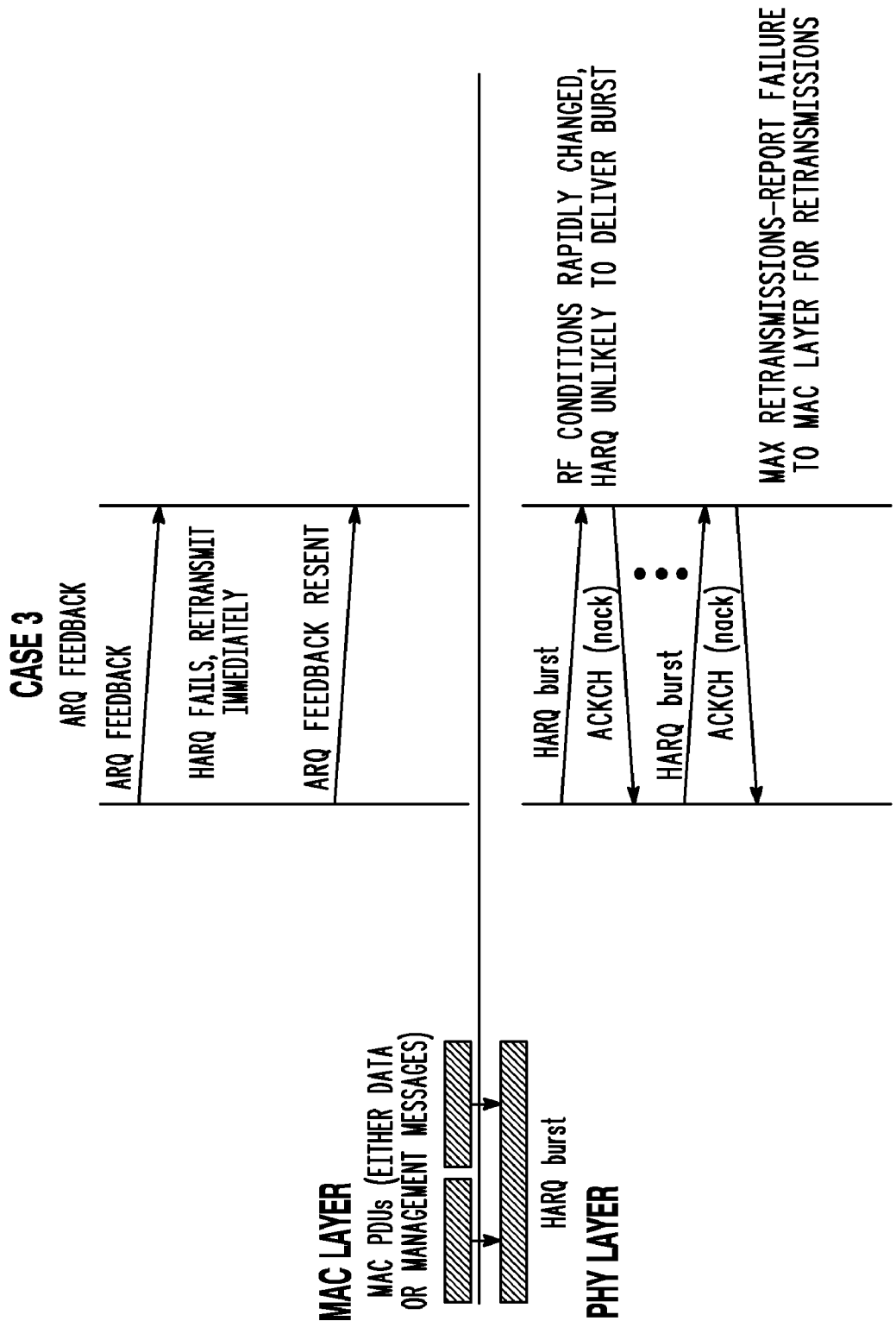
FIG. 5 is a flow chart of a third embodiment of the present invention.

Referring to FIG. 5, in a third embodiment, the present invention also makes HARQ transmission failures known to higher protocols. A failure of HARQ transmission (HARQ negative acknowledgement for all retransmissions) for a burst which has ARQ blocks can be treated as an implicit ARQ- Feedback negatively acknowledging those ARQ blocks. In this case, ARQ feedback is to be sent from a higher layer through the physical layer, which experiences HARQ failure. For example, the RF channel conditions are changing rapidly, and HARQ can not recode the burst to accommodate the changing conditions, which results in HARQ not being able to successfully deliver that burst within its maximum number of retry attempts. Upon detection of the maximum number of retry attempts (HARQ failure), feedback information including a notification of HARQ failure for that particular data burst is sent to the higher layer protocol. At this point, the higher layer protocol can immediately institute a resending of the ARQ blocks instead of waiting for ARQ timers, higher layer protocol ARQ block control mechanisms, or relying on future feedback attempts to continue data transfers, which can result in a significant delay. The ARQ feedback can be reconstructed using the latest knowledge on the ARQ feedback, which currently does not have a retry mechanism.

In particular, when ARQ_RX_WINDOW_START is advanced, any BSN values corresponding to blocks that have not yet been received residing in the interval between the previous and current ARQ_RX_WINDOW_START value shall be marked as received and the receiver shall send an ARQ Feedback IE to the transmitter with the updated information. Any blocks belonging to complete SDUs shall be delivered. As detailed above, HARQ transmission failure can be used to re-initiate sending of ARQ-Feedback IE.

Figure 6:
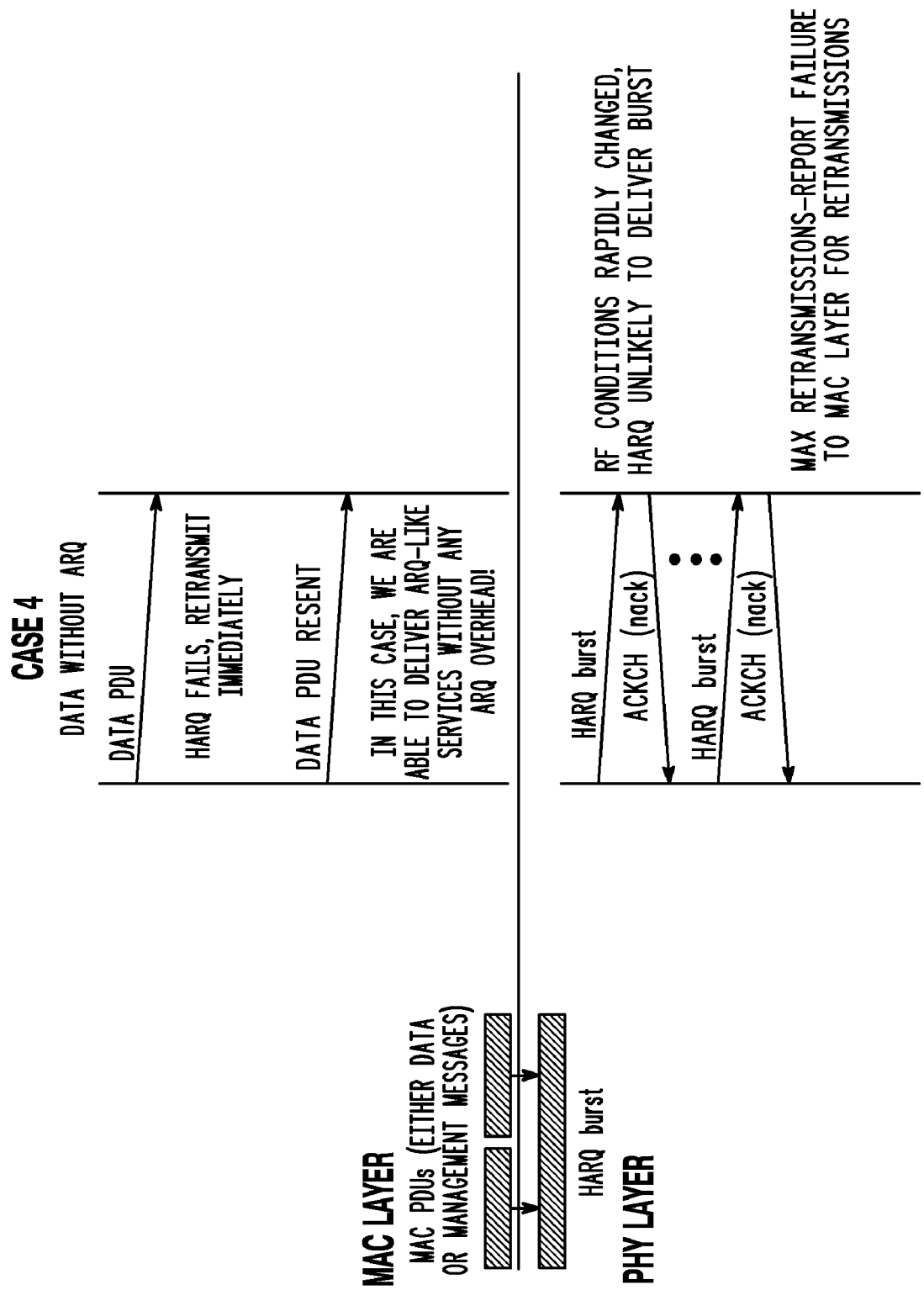
FIG. 6 is a flow chart of a fourth embodiment of the present invention.

Referring to FIG. 6, in a fourth embodiment, the present invention also makes HARQ transmission failures known to higher protocols. In this case, packet data units (PDU) are to be sent without using ARQ from a higher layer through the physical layer, which experiences HARQ failure. For example, the RF channel conditions are changing rapidly, and HARQ can not recode the burst to accommodate the changing conditions, which results in HARQ not being able to successfully deliver that burst within its maximum number of retry attempts. Upon detection of the maximum number of retry attempts (HARQ failure), feedback information including notification of HARQ failure for that particular data burst is sent to the higher layer protocol. At this point, the higher layer protocol can immediately institute a resending of the data packets avoiding data retransmission that otherwise would have occurred at the application layer at endpoints (e.g. TCP) resulting in a significant delay. In addition, the above scenario provides ARQ-like services without any ARQ overhead. As before, the data PDUs have been mapped to the HARQ bursts in the physical layer, there is a correlation that the higher layer can use to determine which PDUs (being either data or management messages) correspond to the failed HARQ data burst. In this way, the higher layer protocol knows which PDUs or portions of PDUs need to be resent.

The ARQ-like handling on non-ARQ connections, by retransmitting PDUs (or fragments) that were NACK'd during HARQ, provides PDUs or fragments thereof that become newly coded HARQ bursts, thus eliminating the HARQ problem that the retransmitted burst must always have the same coding scheme. This effectively provides a degree of confidence close to ARQ (16-bit CRC for HARQ instead of 32-bit CRC for ARQ), without the massive overhead of ARQ.

In IEEE 802.16 ARQ feedback is not scheduled, unlike other cellular system. For example, a mobile station may send ARQ feedback for each frame in which it received data (unless piggybacked on a MAC management message of highest priority). In this case, all of the uplink frame could be consumed by ARQ feedback. The present invention allows the turning off of ARQ in some connections to eliminate all feedback overhead. In addition, HARQ has its own renumbering scheme (either Fragment Sequence Number or PDU sequence number in the PDU header) so block sequence numbers are not necessary. Therefore, the complex mechanisms of ARQ Reset/Discard are not necessary. Further, by preserving PDU SN across retransmissions, the present invention can rescue lost fragments as well. In addition, a non-ARQ connection could enable more efficient use of frame bandwidth as a more aggressive coding scheme could be chosen for non-ARQ connections knowing that retries will occur.

In the embodiments below, HARQ provides a mechanism to determine if a given HARQ burst is successfully received by the receiving entity, such as a mobile station. This HARQ acknowledgement is used to determine if the PDU containing a given control message is successfully received by the mobile station without the need for explicit application level acknowledgement. In particular, there are cases of use of a relative frame number exchanged between the BS and MS, Fast Ranging (Action Time). Due to HARQ retransmissions, the sender must use the frame number in which the receiver successfully received the message/header, not the frame number in which the message/header was originally sent. By synchronizing these relative frame counts with the positive HARQ acknowledgement for the burst containing the message/header, the sender can know the receipt frame number and adjust accordingly.

Figure 7:
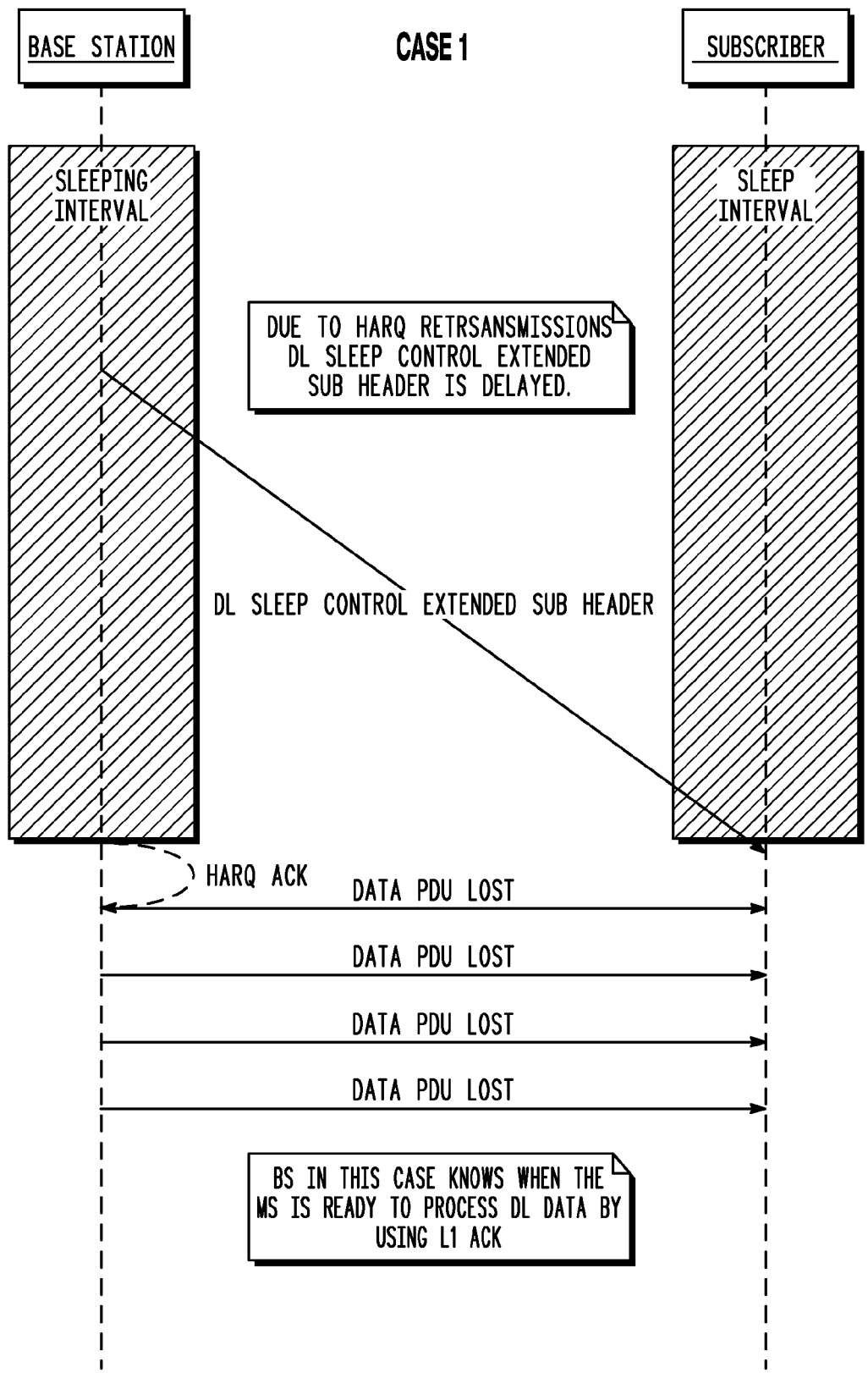
FIG. 7 and FIG. 8 are flow charts of a fifth embodiment of the present invention.
Figure 8:
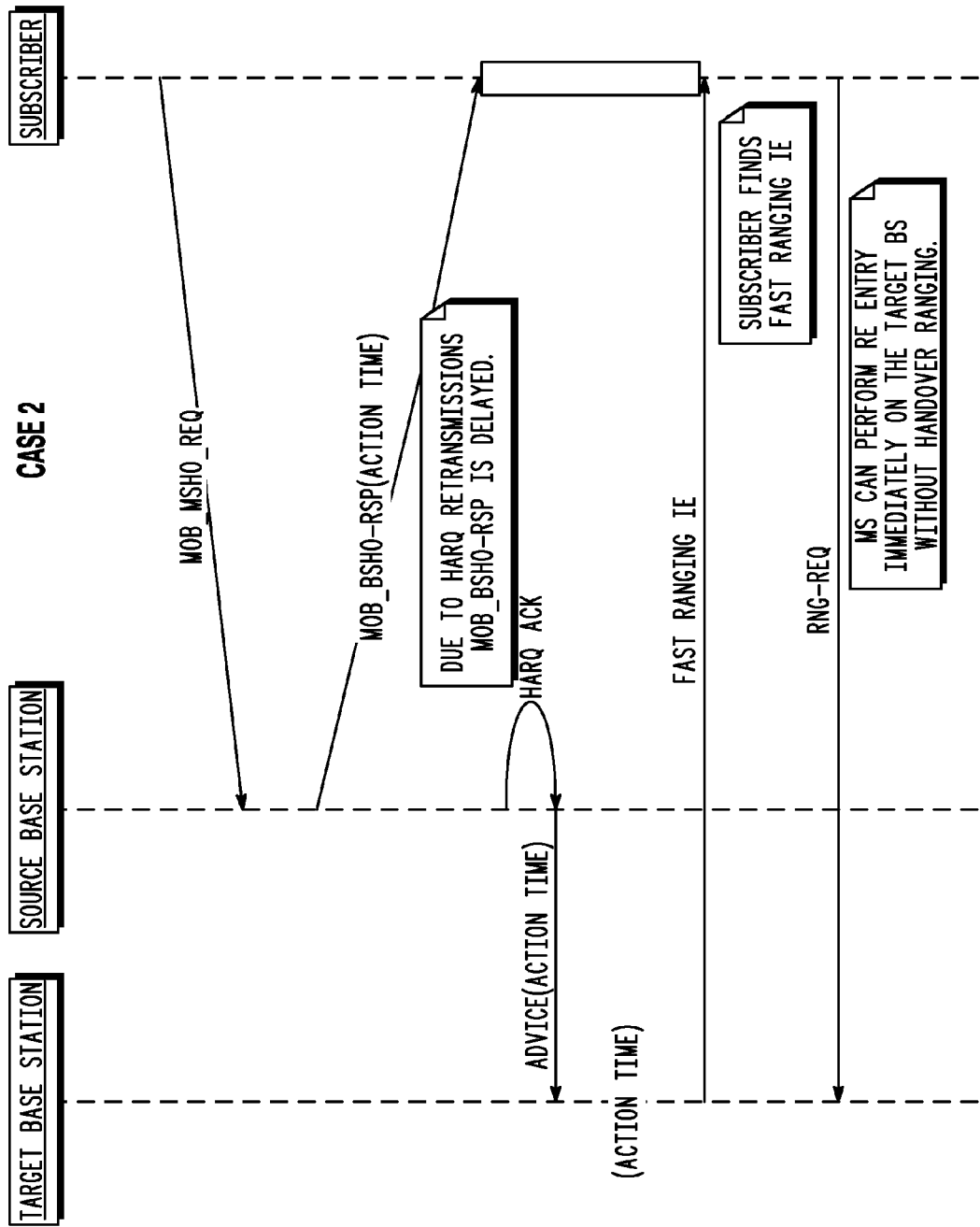

Referring to FIG. 7, in a fifth embodiment, the present invention makes delays due to HARQ retransmissions that are eventually acknowledged known to higher protocols. This embodiment involves handover of a mobile station from a source base station to a target base station. During handover there is an action time negotiated between the base station and the mobile station that defines when the mobile station will arrive at a target base station. In particular, the source base station will send a mobility base station handoff request (MOB_BSHO-REQ) to the mobile station and wait for the mobile station to send a handoff indication message indicating that the mobile station would like to move to the target base station. The target base station will use a non-contention based Fast Ranging procedure which allocates an information element in the uplink MAP.

The Fast Ranging IE at the target base station is sent in the UL MAP of a given frame. The mobile station needs to arrive at the target base station by that start frame and should be looking for the Fast Ranging IE. If the MS misses the Fast Ranging IE, MS may have to do contention based Handover Ranging to perform the handover at the target base station, which can add significant latency at the target for handover. Upon detection of HARQ retransmissions, the present invention provides feedback information to a higher layer protocol that accurately determines when the mobile station receives the MOB_BSHO-RSP message, by correcting the specified action time communicated to target base station by including the delay introduced by any HARQ retransmissions. The target base station can then use the corrected action time to allocate the Fast Ranging IE in the correct frame. In this way, the present invention increases the probability of the mobile station accurately arriving at the target base station to be able to decode Fast Ranging IE and thus reduce the chance of a fall-back to Handover Ranging.

In particular, for handover the Action Time value is defined as number of frames until the Target BS allocates a dedicated transmission opportunity for RNG-REQ message to be transmitted by the MS using Fast Ranging IE. A non-zero value of this parameter means that potential Target BS estimates that channel parameters learned by the MS during Association of that BS stay valid and can be reused during actual Network Re-entry without preceding CDMA-based Initial Ranging. This parameter is decided by the Serving BS based on the information obtained from potential Target BSs over the backbone. The BS determines the start of Fast Ranging transmission as the sum of the frame number of the MOB_BSHO-RSP successfully acknowledged by HARQ, plus the Action Time, if HARQ is enabled.

Advantageously, the present invention uses feedback of HARQ retransmissions in higher layer protocols to allow for quicker recovery and the addition of services that typically require heavy protocols, feedback, and overhead. In addition, the present invention reduces control procedures or PDU latency. Also, the present invention allows higher layer retransmissions of PDUs and PDU fragments with increased reliability where no such mechanism would otherwise exist. Moreover, the present invention can increase both individual and sector throughput by elimination of expensive ARQ feedback.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for providing Hybrid Automatic Repeat Request (HARQ) transmission feedback to a higher layer protocol in a communication system, the method comprising the steps of:
   detecting HARQ retransmissions in a first layer protocol;
   providing feedback information about the HARQ retransmissions from the first layer protocol to a higher layer protocol; and
   instituting corrections at the higher layer protocol, in response to the information transferred from the first layer protocol.

2. The method of claim 1, further comprising the step of correlating HARQ bursts in the first layer protocol with message data of the higher layer protocol.

3. The method of claim 2, wherein the message data consists of at least one of the group of Packet Data Units (PDU) and Media Access Control (MAC) messages.

4. The method of claim 3, wherein the detecting step includes detecting a HARQ retransmission failure, the providing step includes feedback information that there was a HARQ retransmission failure, and the instituting step includes corrections of scheduling an immediate retransmission of at least a fragment of those PDUs that correlate to the failed HARQ bursts.

5. The method of claim 1, wherein the detecting step includes detecting a HARQ retransmission failure, the providing step includes feedback information that there was a HARQ retransmission failure, and the instituting step includes corrections of scheduling an immediate retransmission of higher layer protocol MAC management messages without waiting for higher layer protocol MAC control mechanisms.

6. The method of claim 1, wherein the detecting step includes detecting a HARQ retransmission failure, the providing step includes feedback information that there was a HARQ retransmission failure, and the instituting step includes corrections of scheduling an immediate retransmission of higher layer protocol Automatic Repeat Request (ARQ) blocks without waiting for higher layer protocol ARQ block control mechanisms.

7. The method of claim 1, wherein the detecting step includes detecting a HARQ retransmission failure, the providing step includes feedback information that there was a HARQ retransmission failure, and the instituting step includes corrections of scheduling an immediate retransmission of higher layer protocol reconstructed ARQ feedback.

8. The method of claim 1, wherein the detecting step includes detecting a delay due to HARQ retransmissions and detecting a HARQ ACK message, the providing step includes the delay due to HARQ retransmissions and notification of the ACK message in the feedback information, and the instituting step includes corrections of adding the delay to a handoff action time of a base station such that a mobile station can find a Fast Ranging Information Element (IE) when it is ready to use the Fast Ranging IE.

9. A method for providing Hybrid Automatic Repeat Request (HARQ) transmission feedback to a higher layer protocol in a communication system, the method comprising the steps of:
   detecting a HARQ retransmission failure in a first layer protocol;
   providing feedback information about the HARQ retransmission failure from the first layer protocol to a higher layer protocol;
   correlating HARQ bursts in the first layer protocol with message data of the higher layer protocol; and instituting retransmissions of the message data correlating to the failed HARQ bursts at the higher layer protocol, in response to the information transferred from the first layer protocol.

10. The method of claim 9, wherein the message data consists of at least one of the group of Packet Data Units (PDU) and Media Access Control (MAC) messages, and the instituting step includes scheduling an immediate retransmission of at least a fragment of those PDUs that correlate to the failed HARQ bursts.

11. The method of claim 10, wherein the instituting step includes scheduling an immediate retransmission of higher layer protocol MAC management messages without waiting for higher layer protocol MAC control mechanisms.

12. The method of claim 10, wherein the instituting step includes scheduling an immediate retransmission of higher layer protocol Automatic Repeat Request (ARQ) blocks without waiting for higher layer protocol ARQ block control mechanism.

13. The method of claim 10, wherein the instituting step includes scheduling an immediate retransmission of higher layer protocol reconstructed ARQ feedback.

14. A method for providing Hybrid Automatic Repeat Request (HARQ) transmission feedback to a higher layer protocol in a communication system, the method comprising the steps of:
   detecting a delay due to HARQ retransmissions and detecting a HARQ ACK message in a first layer protocol;
   providing feedback information about the delay due HARQ retransmissions and the HARQ ACK message from the first layer protocol to a higher layer protocol; and
   instituting timing corrections at the higher layer protocol, in response to the information transferred from the first layer protocol.

15. The method of claim 14, wherein the instituting step includes corrections of adding the delay to a handoff action time of a base station such that a mobile station can find a Fast Ranging Information Element (IE) when it is ready to use the Fast Ranging IE.

* * * * *